US011140335B2

(12) United States Patent
Omori et al.

(10) Patent No.: US 11,140,335 B2
(45) Date of Patent: Oct. 5, 2021

(54) METHOD OF ADJUSTING BRIGHTNESS OF ILLUMINATOR IN PROCESSING APPARATUS

(71) Applicant: DISCO CORPORATION, Tokyo (JP)

(72) Inventors: Takafumi Omori, Tokyo (JP); Satoshi Miyata, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 17/143,373

(22) Filed: Jan. 7, 2021

(65) Prior Publication Data

US 2021/0235007 A1 Jul. 29, 2021

(30) Foreign Application Priority Data

Jan. 27, 2020 (JP) .............................. JP2020-010716

(51) Int. Cl.
*H04N 5/235* (2006.01)
*H04N 5/232* (2006.01)

(52) U.S. Cl.
CPC ....... *H04N 5/2354* (2013.01); *H04N 5/23229* (2013.01)

(58) Field of Classification Search
None
See application file for complete search history.

(56) References Cited

U.S. PATENT DOCUMENTS

| 10,816,952 | B2 * | 10/2020 | Miyata | ................ | G06F 3/04886 |
| 2007/0285282 | A1 * | 12/2007 | Nakayama | ............. | H04N 7/181 |
| | | | | | 340/937 |
| 2010/0155587 | A1 * | 6/2010 | Nikittin | ................ | H04N 5/3655 |
| | | | | | 250/252.1 |
| 2011/0158629 | A1 * | 6/2011 | Kamiya | ................. | G03B 35/08 |
| | | | | | 396/325 |
| 2013/0235163 | A1 * | 9/2013 | Joo | ........................ | G03B 35/08 |
| | | | | | 348/47 |
| 2014/0063284 | A1 * | 3/2014 | Yanagidate | ........ | H04N 5/23293 |
| | | | | | 348/223.1 |
| 2016/0014316 | A1 * | 1/2016 | Liao | ...................... | G06K 9/209 |
| | | | | | 348/223.1 |

(Continued)

FOREIGN PATENT DOCUMENTS

| JP | 2002011641 A | 1/2002 |
| JP | 2003319253 A | 11/2003 |

*Primary Examiner* — Cynthia Segura
(74) *Attorney, Agent, or Firm* — Greer Burns & Crain Ltd.

(57) ABSTRACT

A method of adjusting the brightness of an illuminator in a processing apparatus includes, by a first processing apparatus, storing a sample image obtained by photographing a workpiece with a brightness specified by a first control value, together with the first control value, copying the sample image, the first control value and a processing condition to a second processing apparatus, by the second processing apparatus, storing a plurality of comparative images obtained by photographing the workpiece with brightnesses specified by a plurality of different control values, identifying a control value at a time of photographing a comparative image having a minimum difference in brightness from the sample image as a second control value, by comparing the sample image with the plurality of comparative images, and setting a difference between the first and second control values as a correction value of the control value of the second processing apparatus.

3 Claims, 9 Drawing Sheets

(56) References Cited

U.S. PATENT DOCUMENTS

2016/0234437 A1* 8/2016 Kuwada ............. H04N 5/23238
2017/0272621 A1* 9/2017 Park ................... H04N 5/23216
2017/0347007 A1* 11/2017 Wu .................... G06K 9/00355

* cited by examiner

METHOD OF ADJUSTING BRIGHTNESS OF ILLUMINATOR IN PROCESSING APPARATUS

BACKGROUND OF THE INVENTION

Field of the Invention

The present invention relates to an adjusting method of adjusting the brightness of an illuminator in a processing apparatus including a camera unit for photographing a workpiece, the camera unit having the illuminator, and a processing unit for processing the workpiece.

Description of the Related Art

A processing apparatus is known which processes workpieces such as semiconductor wafers or the like having various kinds of patterns of circuits, devices, or the like formed on one surface side. As processing apparatuses, there are, for example, a cutting apparatus that cuts a workpiece along planned dividing lines (streets) set on the one surface side of the workpiece and a laser processing apparatus that processes the workpiece by scanning the condensing point of a laser beam along the planned dividing lines.

When the workpiece is to be processed along the planned dividing lines, the one surface side of the workpiece is first photographed by using a camera disposed above the workpiece. Then, the position of a predetermined pattern (so-called key pattern) provided on the one surface side is identified by performing image processing such as edge detection or the like on a resulting image, and the position of a planned dividing line is identified by using the position of the key pattern. In addition, after the workpiece is processed along the planned dividing lines, the position, range, state, and the like of a cut groove formed by cutting or a laser processing trace formed by laser processing are inspected by performing image processing on an image obtained by imaging the one surface side of the workpiece.

The camera included in the processing apparatus includes an objective lens and an illuminator (see Japanese Patent Laid-Open No. 2002-11641, for example). Used as the illuminator are a coaxial epi-illumination unit that irradiates the one surface side of the workpiece with light along the optical axis of the objective lens and a side-illumination lighting unit that irradiates the one surface side of the workpiece with light along a direction inclined with respect to the optical axis of the objective lens. When the one surface side of the workpiece is photographed, the photographing is performed after the amount of light of the coaxial epi-illumination unit and the amount of light of the side-illumination lighting unit are adjusted appropriately by a dimmer. While there are various control methods as dimming methods, a phase control method, for example, is adopted.

In a case where dimming is performed by the phase control method, the dimmer, for example, includes a semiconductor element capable of electrically connecting an alternating-current power supply and a light source such as a halogen lamp or the like to each other, and a control circuit that controls an energization time of the light source by supplying a predetermined signal to the semiconductor element and thereby making the semiconductor element conduct current. A dimming signal indicating a control value specifying the amount of energization of the light source is input to the control circuit. The amount of light of each illumination unit is adjusted by adjusting the amount of energization of the light source. Incidentally, in a case where a light emitting diode (LED) is used as the light source, the amount of light may be adjusted by adjusting voltage applied to the LED. Appropriately adjusting the amount of light of the light source of each illumination unit facilitates identification of the key pattern, the cut groove, the laser processing trace, and the like when image processing is performed on the image obtained by photographing. A result of the image processing may differ greatly when the amount of light of the light source of the coaxial epi-illumination unit and the amount of light of the light source of the side-illumination lighting unit differ from each other by only a few percent. The amount of light of each light source is therefore an important photographing condition.

In a factory in which a plurality of processing apparatuses of a same type are installed, a plurality of workpieces of a same kind are often processed by using the plurality of processing apparatuses. In this case, a photographing condition such as a control value or the like and a processing condition at a time of processing workpieces are copied from a first processing apparatus to a second processing apparatus. Thus, the second processing apparatus performs photographing, processing, and the like of workpieces under the same conditions as those of the first processing apparatus. However, in the processing apparatuses, the brightness of a light source may be decreased due to degradation in the light source, adhesion of dirt to the light source, or the like (see Japanese Patent Laid-Open No. 2003-319253, for example).

SUMMARY OF THE INVENTION

For example, in a case where the performance of the light source of the second processing apparatus is degraded, the second processing apparatus obtains an image different in shade or brightness as compared with an image obtained in the first processing apparatus even when a dimming signal indicating the same control value as a control value used in the first processing apparatus is input to the dimmer of the second processing apparatus. In this case, in the second processing apparatus, a problem may occur in identifying the position of a planned dividing line or inspecting the position, range, state, and the like of a cut groove, a laser processing trace, or the like. The present invention has been made in view of such problems. It is an object of the present invention to reduce a difference in brightness between illuminators in a plurality of processing apparatuses.

In accordance with an aspect of the present invention, there is provided a method of adjusting brightness of an illuminator in a processing apparatus, the method including a first storing step of a storage device of a first processing apparatus storing a sample image obtained by photographing a predetermined pattern arranged on a workpiece with a brightness of an illuminator, the brightness being specified by a first control value, together with the first control value in the first processing apparatus among a plurality of processing apparatuses each including a camera unit including the illuminator adjustable in brightness, an objective lens, and an imaging element, and configured to photograph a workpiece by making reflected light of light applied from the illuminator to the workpiece incident on the imaging element via the objective lens, a processing unit configured to process the workpiece on a basis of an image obtained by the camera unit, and a storage device configured to store a control value specifying the brightness of the illuminator and a processing condition of the processing unit when the processing unit processes the workpiece, a copying step of copying the sample image and the first control value stored in the storage device of the first processing apparatus together with the processing condition used in the first processing apparatus, and storing the sample image, the first control value, and the processing condition in the storage device of a second processing apparatus, a second storing step of the storage device of the second processing apparatus storing a plurality of comparative images obtained by photographing the predetermined pattern of the workpiece with brightnesses of the illuminator, the brightnesses being specified by a plurality of different control values, in the second processing apparatus, a control value identifying step of comparing the sample image with the plurality of comparative images, and identifying, as a second control value, a control value at a time of photographing a comparative image having a minimum difference in brightness from the sample image, and a correction value setting step of setting, in the second processing apparatus, a difference between the second control value and the first control value as a correction value of the control value of the second processing apparatus with respect to the first processing apparatus.

Preferably, in the control value identifying step, differences between numerical values indicating brightness levels of respective image-forming pixels are calculated at respective identical positions in a vertical direction and a horizontal direction in the sample image and each of the comparative images, and a sum total of the differences is compared.

In addition, preferably, the illuminator includes a coaxial epi-illumination unit configured to apply light along an optical axis of the objective lens and a side-illumination lighting unit configured to apply light inclined with respect to the optical axis of the objective lens. In the first storing step, the first control value includes a third control value and a fourth control value, the sample image includes a first sample image and a second sample image, the storage device of the first processing apparatus stores, together with the third control value and the fourth control value, the first sample image obtained by photographing the predetermined pattern of the workpiece with only the coaxial epi-illumination unit lit according to the third control value and the second sample image obtained by photographing the predetermined pattern of the workpiece with only the side-illumination lighting unit lit according to the fourth control value. In the second storing step, the storage device of the second processing apparatus stores a plurality of first comparative images obtained by photographing the predetermined pattern of the workpiece with only the coaxial epi-illumination unit lit according to a plurality of respective different control values and a plurality of second comparative images obtained by photographing the predetermined pattern of the workpiece with only the side-illumination lighting unit lit according to a plurality of respective different control values. In the control value identifying step, the second control value includes a fifth control value and a sixth control value, a control value at a time of photographing a first comparative image having a minimum difference in brightness from the first sample image is identified as the fifth control value by comparing the first sample image with each of the first comparative images, and a control value at a time of photographing a second comparative image having a minimum difference in brightness from the second sample image is identified as the sixth control value by comparing the second sample image with each of the second comparative images. In the correction value setting step, a difference between the fifth control value and the third control value is set as a first correction value of the control value of the second processing apparatus with respect to the first processing apparatus in the second processing apparatus, and a difference between the sixth control value and the fourth control value is set as a second correction value of the control value of the second processing apparatus with respect to the first processing apparatus in the second processing apparatus.

In a method of adjusting the brightness of an illuminator in a processing apparatus according to one aspect of the present invention, first, the storage device of a first processing apparatus stores a sample image obtained by photographing a predetermined pattern arranged on a workpiece with a brightness of an illuminator, the brightness being specified by a first control value, together with the first control value (first storing step). Next, the sample image and the first control value are copied together with a processing condition, and the sample image, the first control value, and the processing condition are stored in the storage device of a second processing apparatus (copying step). Then, the storage device of the second processing apparatus stores a plurality of comparative images obtained by photographing the predetermined pattern of the workpiece with brightnesses of an illuminator, the brightnesses being specified by a plurality of different control values, in the second processing apparatus (second storing step). Thereafter, the sample image is compared with the plurality of comparative images, and a control value at a time of photographing a comparative image having a minimum difference in brightness from the sample image is identified as a second control value (control value identifying step). Then, a difference between the second control value and the first control value is set as a correction value of the control value of the second processing apparatus with respect to the first processing apparatus in the second processing apparatus (correction value setting step).

Thus, when a dimming signal indicating a same control value is input to the dimmer of each processing apparatus, the brightness of the illuminator of the second processing apparatus can be corrected by using the correction value. Therefore, even when a light source degradation or the like occurs in the second processing apparatus, a difference in brightness between the illuminators can be reduced. That is, a difference in brightness between images obtained by the camera units of the respective processing apparatuses can be reduced. In addition, it is possible to reduce the difference between the images obtained by the camera units of the respective processing apparatuses without replacing the light source or the like and without using a special test piece for measuring a difference in amount of light between the camera units.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
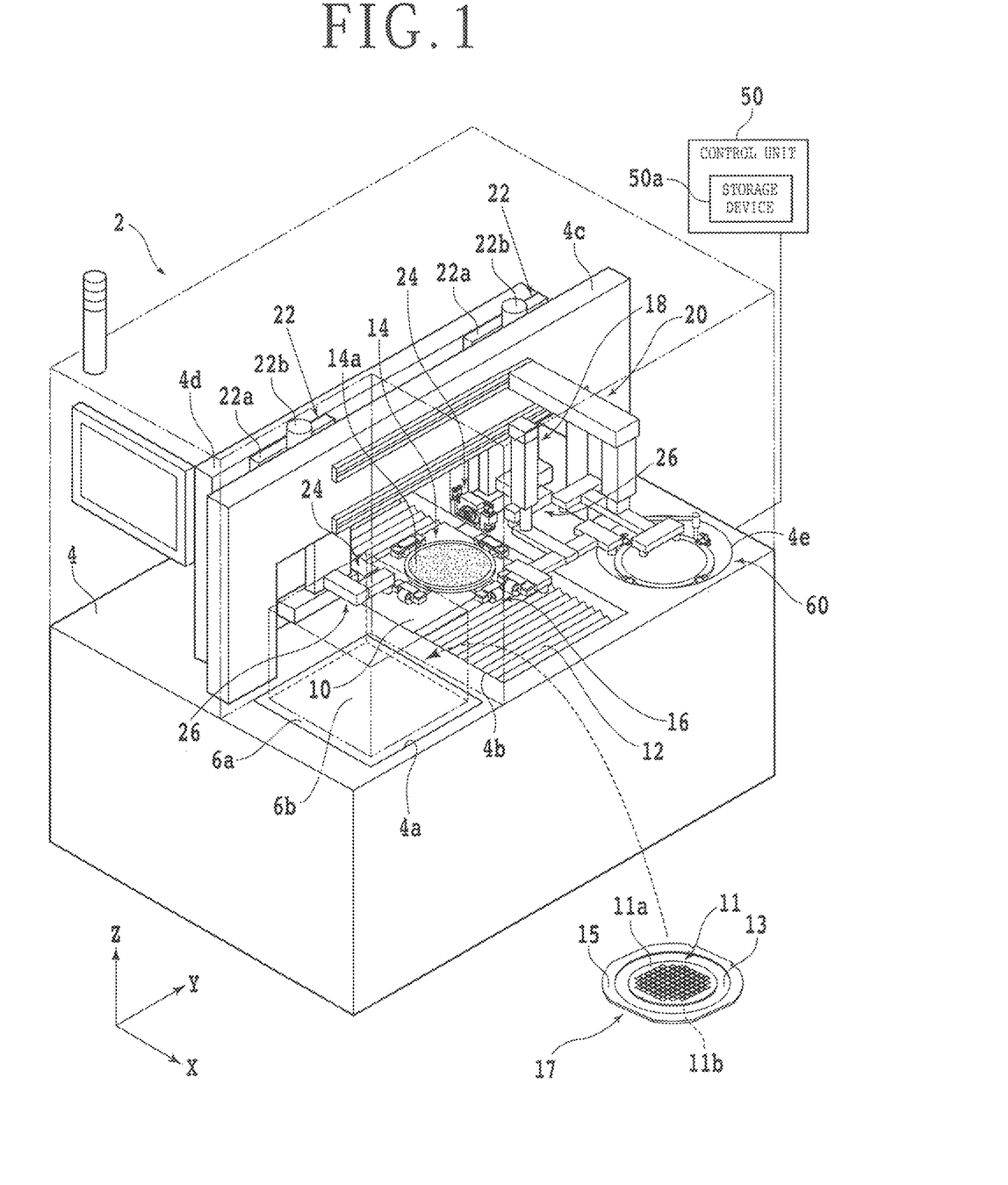
FIG. 1 is a perspective view depicting an example of a cutting apparatus.

An embodiment according to one aspect of the present invention will be described with reference to the accompanying drawings. FIG. 1 is a perspective view depicting an example of a cutting apparatus (processing apparatus) 2 according to an embodiment of the present invention. Incidentally, FIG. 1 depicts a part of constituent elements in a functional block diagram. In addition, an X-axis direction (a processing feed direction), a Y-axis direction (an indexing feed direction), and a Z-axis direction (a vertical direction and a height direction) in FIG. 1 are directions orthogonal to one another. The cutting apparatus 2 includes a base 4 that supports the constituent elements.

An opening 4a is provided in a corner portion of the front of the base 4. A cassette elevator 6a raised and lowered by a raising and lowering mechanism (not depicted) is provided within the opening 4a. A cassette 6b for housing a plurality of workpieces 11 is mounted on the upper surface of the cassette elevator 6a. The workpieces 11 are, for example, a disk-shaped wafer formed of a semiconductor material such as silicon or the like. Incidentally, there is no limitation on the material, shape, structure, size, and the like of the workpieces 11. A plurality of planned dividing lines (streets) intersecting one another are set on a top surface 11a side of a workpiece 11.

A device such as an integrated circuit (IC) or the like is formed on the top surface 11a side of each of regions demarcated by the plurality of planned dividing lines. In addition, a key pattern 11c (see FIG. 3B and the like) is formed in a region in which the devices are formed. The key pattern 11c is, for example, a region in which a metallic layer is exposed on the top surface 11a side as a result of an insulating layer being partly removed in a laminated structure having the metallic layer and the insulating layer formed on the metallic layer. However, the configuration of the key pattern 11c is not limited to the present example.

A dicing tape (adhesive tape) 13 having a diameter larger than that of the workpiece 11 is affixed to an undersurface 11b of the workpiece 11, the undersurface 11b being located on an opposite side from the top surface 11a. One surface of an annular frame 15 made of a metal is affixed to an outer circumferential portion of the dicing tape 13. In a state of a workpiece unit 17 having the workpiece 11 thus supported by the frame 15 via the dicing tape 13, the workpiece 11 is housed in the cassette 6b. Incidentally, a plurality of workpiece units 17 are housed in the cassette 6b.

A rectangular opening 4b having a long side along the X-axis direction is formed on the side of the cassette elevator 6a. Provided within the opening 4b are a table cover 10 and a bellows-shaped cover 12 that expands and contracts in the X-axis direction. A chuck table 14 is provided on the table cover 10. In addition, a rotational driving source (not depicted) such as a motor for rotating the chuck table 14 about a rotational axis substantially parallel with the Z-axis direction (vertical direction) is disposed below the table cover 10. A ball screw type X-axis moving mechanism (processing feed unit) not depicted is provided below the rotational driving source. The chuck table 14 and the table cover 10 are moved along the X-axis direction by operating the X-axis moving mechanism.

The chuck table 14 has a disk-shaped frame body formed of a metal. The frame body has a disk-shaped recessed portion formed therein. A suction passage (not depicted) is formed in a bottom portion of the recessed portion. One end of the suction passage is exposed on the bottom surface of the recessed portion. Another end of the suction passage is connected to a suction source (not depicted) such as an ejector. A disk-shaped porous plate is fixed to the recessed portion. The upper surface of the porous plate is substantially flat. When the suction source is operated, a negative pressure occurs in the upper surface (holding surface 14a) of the porous plate. Incidentally, clamps 16 for fixing the frame 15 are provided on the periphery of the frame body.

A pair of guide rails (not depicted) substantially parallel with the Y-axis direction is provided over a region of the opening 4b which region is adjacent to the opening 4a. A gate type support 4c is provided more to the inside of the cutting apparatus 2 than the pair of guide rails in the X-axis direction such that the support 4c straddles the opening 4b. A lower transfer unit 18 and an upper transfer unit 20 that each transfer the workpiece unit 17 are provided on one surface side of the support 4c. Each of the lower transfer unit 18 and the upper transfer unit 20 has a plurality of suction pads that suck and hold the workpiece unit 17 by a negative pressure.

A gate type support 4d is provided on an opposite side of the support 4c from the lower transfer unit 18 and the upper transfer unit 20 such that the support 4d straddles the opening 4b. A pair of processing unit moving mechanisms (an indexing feed unit and a cutting feed unit) 22 is provided on the front surface side of the support 4d. The pair of processing unit moving mechanisms 22 has a pair of Y-axis guide rails (not depicted) arranged on the front surface of the support 4d and substantially parallel with the Y-axis direction. Two Y-axis moving plates 22a are attached to the pair of Y-axis guide rails so as to be slidable in the Y-axis direction.

A nut portion (not depicted) is provided on the back surface (that is, the support 4d) side of each of the Y-axis moving plates 22a. A Y-axis ball screw (not depicted) substantially parallel with the Y-axis guide rails is rotatably coupled to the nut portion. A Y-axis pulse motor (not depicted) is coupled to one end portion of each Y-axis ball screw. When the Y-axis ball screw is rotated by the Y-axis pulse motor, each Y-axis moving plate 22a moves along the Y-axis guide rails.

A pair of Z-axis guide rails (not depicted) substantially parallel with the Z-axis direction is provided on the front surface (that is, the support 4c) side of each Y-axis moving plate 22a. A Z-axis moving plate (not depicted) is slidably attached to the Z-axis guide rails. A nut portion (not depicted) is provided on the back surface (that is, the support 4*d*) side of the Z-axis moving plate. A Z-axis ball screw (not depicted) parallel with the Z-axis guide rails is rotatably coupled to the nut portion.

A Z-axis pulse motor 22*b* is coupled to one end portion of the Z-axis ball screw (not depicted). When the Z-axis ball screw is rotated by the Z-axis pulse motor 22*b*, the Z-axis moving plate moves in the Z-axis direction along the Z-axis guide rails. A cutting unit (processing unit) 24 that cuts (processes) the workpiece 11 is provided to each Z-axis moving plate. In the present embodiment, a pair of cutting units 24 is provided along the Y-axis direction.

The cutting units 24 have a tubular spindle housing. The spindle housing partly houses a spindle (not depicted) disposed substantially in parallel with the Y-axis direction. The spindle is rotatably supported within the spindle housing. A rotational driving source (not depicted) such as a servomotor is coupled to one end of the spindle. In addition, a cutting blade having an annular cutting edge is fitted to another end of the spindle. A camera unit 26 for imaging the workpiece 11 is provided in a position adjacent to the cutting unit 24.

Figure 2A:
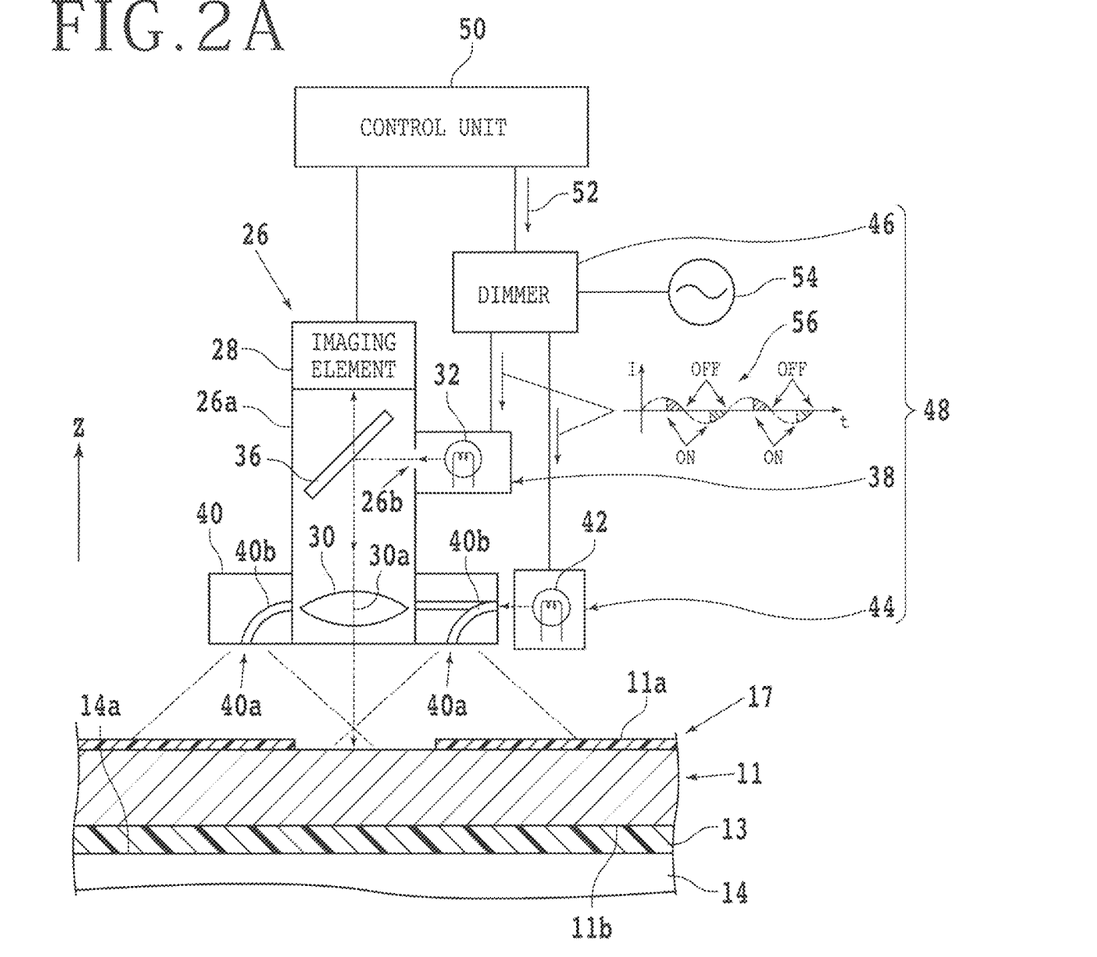
FIG. 2A is a diagram of assistance in explaining a camera unit.
Figure 2B:
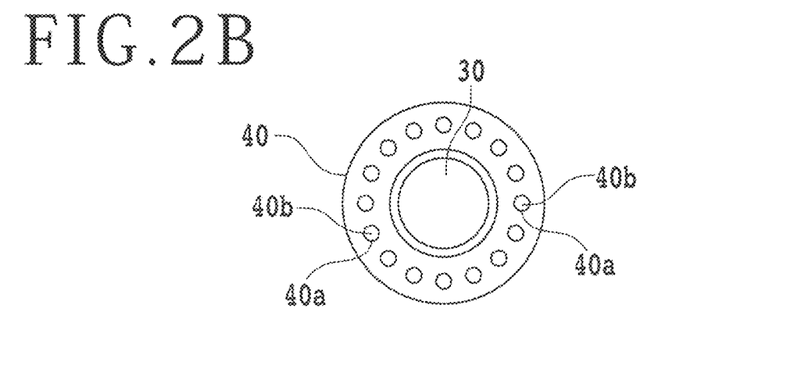
FIG. 2B is a bottom view of the camera unit.

The camera unit 26 will be described in the following with reference to FIG. 2A and FIG. 2B. FIG. 2A is a diagram of assistance in explaining the camera unit 26. Incidentally, FIG. 2A depicts a part of constituent elements as functional blocks. FIG. 2B is a bottom view of the camera unit 26. The camera unit 26 has a cylindrical casing 26*a* disposed substantially in parallel with the Z-axis direction. An imaging element 28 such as a charge coupled device (CCD) image sensor or a complementary metal oxide semiconductor (CMOS) image sensor is fixed to an upper end portion of the casing 26*a*.

An objective lens 30 is fixed to a lower end portion of the casing 26*a* such that an optical axis 30*a* of the objective lens 30 is substantially parallel with the Z-axis direction. The casing 26*a*, the imaging element 28, and the objective lens 30 form a camera. The workpiece 11 having the undersurface 11*b* side held by the holding surface 14*a* is disposed below the objective lens 30. An opening 26*b* is provided in a side portion of the casing 26*a*. A substantially cylindrical casing is disposed so as to cover the opening 26*b*. A first light source 32 such as a halogen lamp is provided within the casing. Light emitted by the first light source 32 enters the inside of the casing 26*a* via the opening 26*b*.

A half mirror 36 is disposed between the imaging element 28 and the objective lens 30 in a state in which the surface of the half mirror 36 is inclined by substantially 45 degrees with respect to the optical axis 30*a* of the objective lens 30. A part of the light entering the inside of the casing 26*a* from the opening 26*b* is reflected by the half mirror 36, and travels downward along the optical axis 30*a* of the objective lens 30. The light reflected by the half mirror 36 passes through the objective lens 30, and is applied to the top surface 11*a* of the workpiece 11. The light (reflected light) reflected on the top surface 11*a* side enters the imaging element 28 via the objective lens 30, the half mirror 36, and an image-forming lens (not depicted). When a coaxial epi-illumination unit 38 formed by the objective lens 30, the first light source 32, the half mirror 36, and the like is thus used, the top surface 11*a* side can be photographed by the light applied to the top surface 11*a* side along the optical axis 30*a*.

An annular casing 40 is disposed on a side portion of a lower end portion of the casing 26*a*. A plurality of openings 40*a* are formed in the bottom surface of the casing 40. The plurality of openings 40*a* are arranged at substantially equal intervals along the outer circumferential direction of the bottom surface of the casing 40. One end portion of an optical fiber 40*b* is fixed to each of the openings. Another end portion of the optical fiber 40*b* is connected to a second light source 42 such as a halogen lamp, the second light source 42 being disposed on the outside of the casing 40. Light emitted by the second light source 42 is radially applied downward from the one end portion of the optical fiber 40*b*.

The light incident on the top surface 11*a* side at a predetermined angle of incidence from the one end portion of the optical fiber 40*b* is reflected from the top surface 11*a* side at a predetermined angle of reflection, and enters the imaging element 28 via the objective lens 30 and the half mirror 36. When a side-illumination lighting unit 44 formed by the casing 40, the optical fibers 40*b*, the second light source 42, and the like is thus used, the top surface 11*a* side of the workpiece 11 can be photographed in a state in which the light applied in an inclined manner with respect to the optical axis 30*a* is applied obliquely with respect to the top surface 11*a*.

Each of the first light source 32 and the second light source 42 is connected with a dimmer 46 that adjusts an amount of light (brightness) by adjusting an amount of energization applied to each light source. Incidentally, in the present embodiment, the coaxial epi-illumination unit 38, the side-illumination lighting unit 44, and the dimmer 46 will be referred to collectively as an illuminator 48. The dimmer 46 is connected with a control unit 50 that controls the operation of the dimmer 46. Incidentally, the control unit 50 also controls the operation of the cassette elevator 6*a*, the suction source, the X-axis moving mechanism, the pair of processing unit moving mechanisms 22, the cutting unit 24, the lower transfer unit 18, the upper transfer unit 20, the imaging element 28, a cleaning unit 60 (to be described later), and the like.

The control unit 50 is, for example, formed by a computer including a processing device such as a processor or the like typified by a central processing unit (CPU), a main storage device such as a dynamic random access memory (DRAM), a static random access memory (SRAM), or a read only memory (ROM), and an auxiliary storage device such as a flash memory, a hard disk drive, or a solid-state drive. The auxiliary storage device stores software including a predetermined program. Functions of the control unit 50 are implemented by operating the processing device or the like according to the software. Incidentally, the processing apparatus may be configured by using an application specific integrated circuit (ASIC), a field-programmable gate array (FPGA), or the like.

At least a part of the auxiliary storage device functions as a storage device 50*a* (see FIG. 1) storing a processing condition (the rotational speed of the spindle, a flow rate of cutting water, the moving speed of the chuck table 14, and the like) when the cutting unit 24 cuts the workpiece 11. The storage device 50*a* further stores a photographing condition including a control value (to be described later) specifying an amount of energization applied to the dimmer 46, images photographed by the camera unit 26, and the like. In the following, description will be of a method of adjusting the brightness of the illuminator 48 by controlling the dimmer 46 by a phase control method using the control unit 50.

The dimmer 46, for example, includes a first semiconductor element (for example, a triac) (not depicted) that switches between conduction and non-conduction between an alternating-current power supply 54 and the first light source 32, and a first control circuit (not depicted) that controls the operation of the first semiconductor element. In addition, the dimmer 46 includes a second semiconductor element (for example, a triac) (not depicted) that switches between conduction and non-conduction between the alternating-current power supply 54 and the second light source 42, and a second control circuit (not depicted) that controls the operation of the second semiconductor element.

A dimming signal indicating a control value 52 specifying respective amounts of energization applied from the alternating-current power supply 54 to the first light source 32 and the second light source 42 is sent from the control unit 50 to the first and second control circuits. An amount of light of each light source is specified by specifying an amount of energization. A control value 52 in the present embodiment is a numerical value corresponding to a time from a start time point of a half cycle of an alternating current to timing in which the first light source 32 and/or the second light source 42 is energized by inputting a gate signal to the semiconductor element.

When the gate signal is input to the semiconductor element, the first light source 32 and/or the second light source 42 is energized, and the first light source 32 and/or the second light source 42 is energized from energization timing to an end time point of the half cycle of the alternating current. The first light source 32 and the second light source 42 become brighter in proportion to an energization time. A dimming signal indicating a control value 52 specifying 50% as amounts of energization of the first light source 32 and the second light source 42, for example, is input to the control circuits. In this case, supposing that the half cycle of the alternating current output from the alternating-current power supply 54 is T/2, the first light source 32 and the second light source 42 are energized for a period from T/4 to T/2, as indicated by a current waveform 56. Such energization control is repeated in each half cycle. In addition, for example, when a dimming signal indicating a control value 52 specifying 0% as the amounts of energization of the first light source 32 and the second light source 42 is input to the control circuits, the gate signal is input to the first and second semiconductor elements in timing of a start time point of T/2. In this case, the first light source 32 and the second light source 42 are practically not energized. Such energization control is repeated in each half cycle.

Figure 3A:
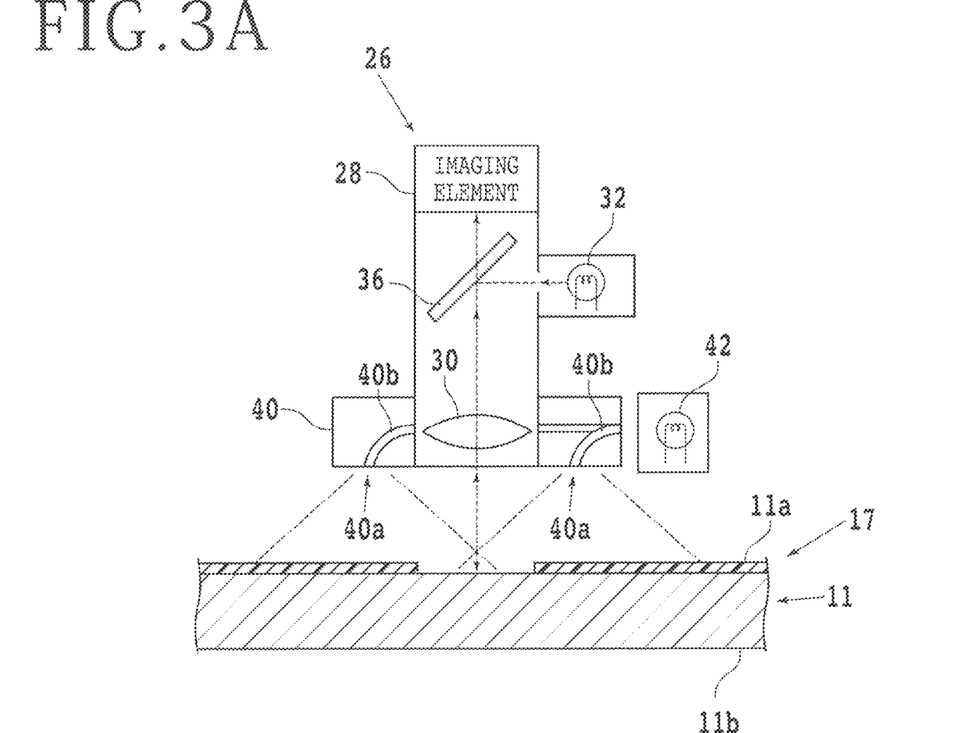
FIG. 3A is a diagram depicting a state of photographing a workpiece.
Figure 3B:
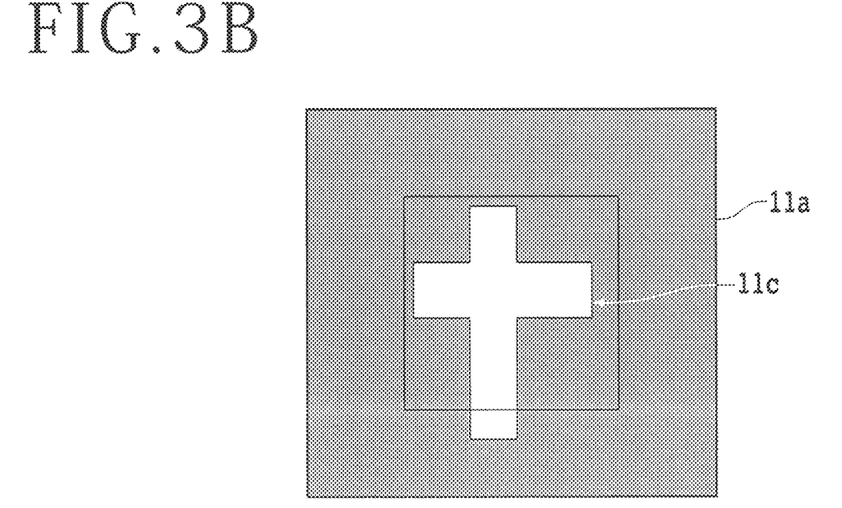
FIG. 3B is a schematic diagram of an image obtained by the photographing.

FIG. 3A is a diagram depicting a state of photographing the top surface 11a side of the workpiece 11 having the undersurface 11b side held by the holding surface 14a by using both of the coaxial epi-illumination unit 38 and the side-illumination lighting unit 44. FIG. 3B is a schematic diagram of an image obtained by the photographing. The control value 52 can individually specify amounts of light of the first light source 32 and the second light source 42. In FIG. 3A, the amount of energization of the first light source 32 constituting the coaxial epi-illumination unit 38 is set at 20%, and the amount of energization of the second light source 42 constituting the side-illumination lighting unit 44 is set at 20%. In the image depicted in FIG. 3B, the key pattern 11c is photographed relatively well.

Figure 4A:
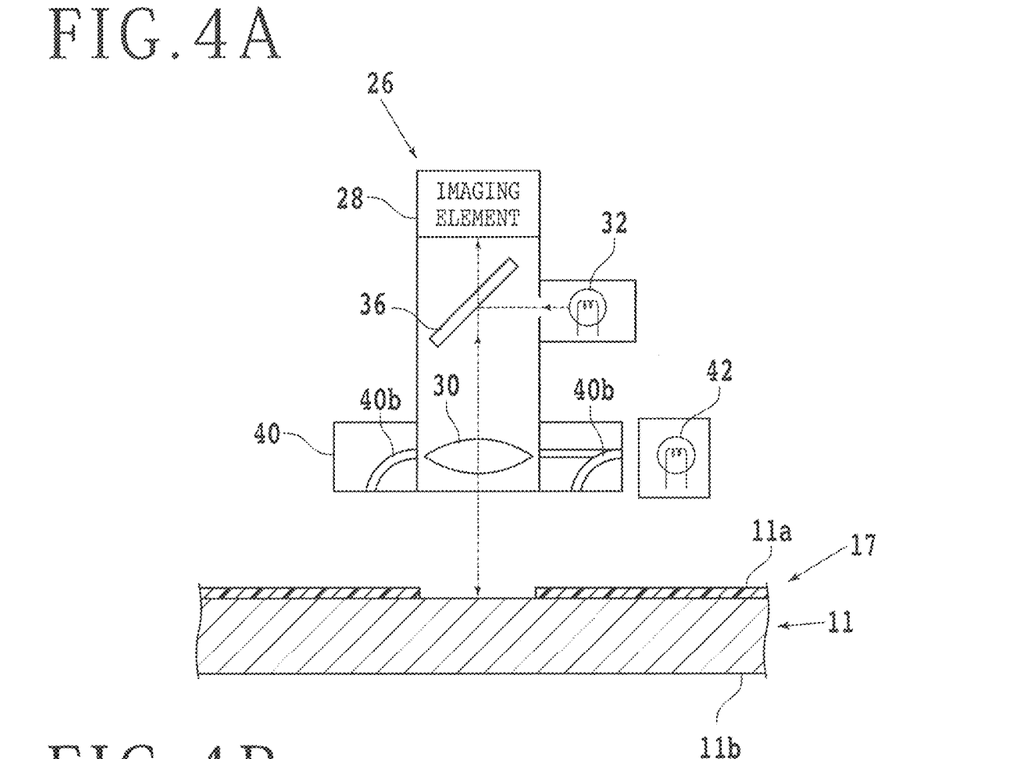
FIG. 4A is a diagram depicting a state of performing photographing with only a coaxial epi-illumination unit lit.
Figure 4B:
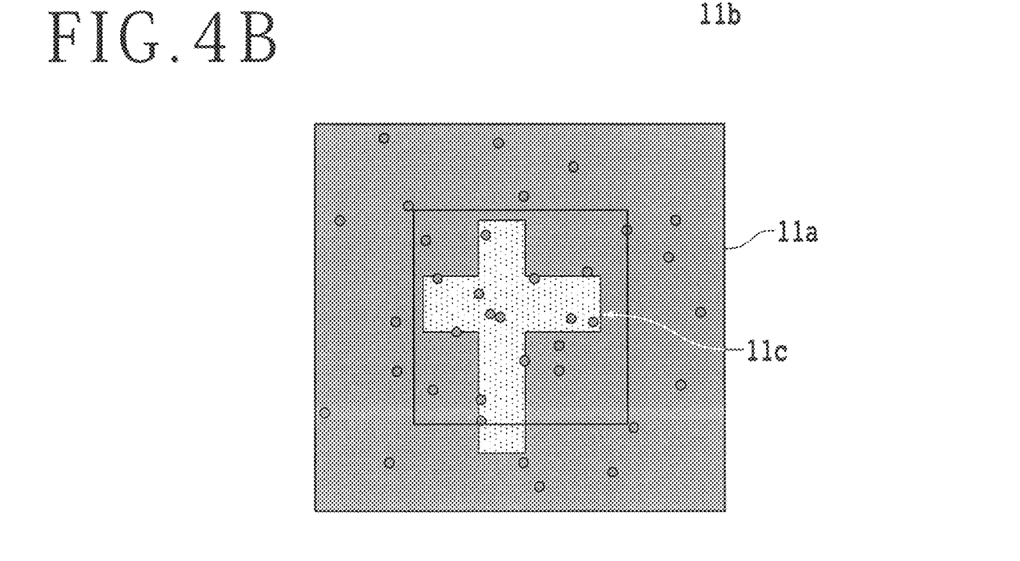
FIG. 4B is a schematic diagram of an image obtained by the photographing depicted in FIG. 4A.

The key pattern 11c in the present embodiment is a cross-shaped region. An image including the key pattern 11c is, for example, used to align a planned dividing line of the workpiece 11 and the cutting blade of the cutting unit 24 with each other. FIG. 4A is a diagram depicting a state of photographing the top surface 11a side with only the coaxial epi-illumination unit 38 lit. FIG. 4B is a schematic diagram of an image obtained by performing the photographing with only the coaxial epi-illumination unit 38 lit.

Figure 5A:
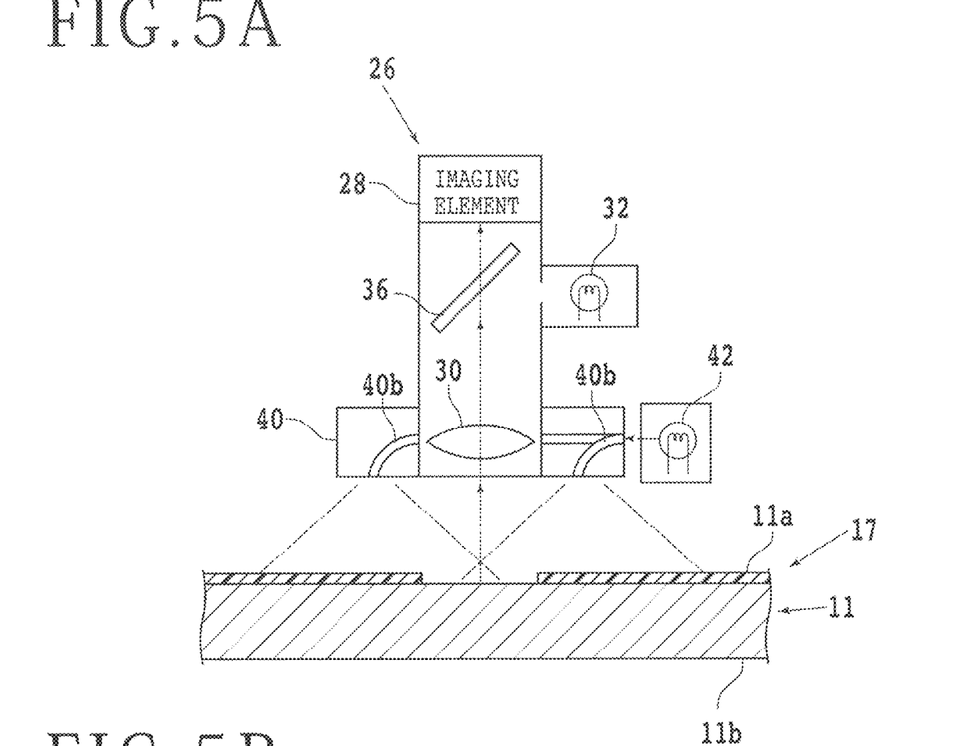
FIG. 5A is a diagram depicting a state of performing photographing with only a side-illumination lighting unit lit.
Figure 5B:
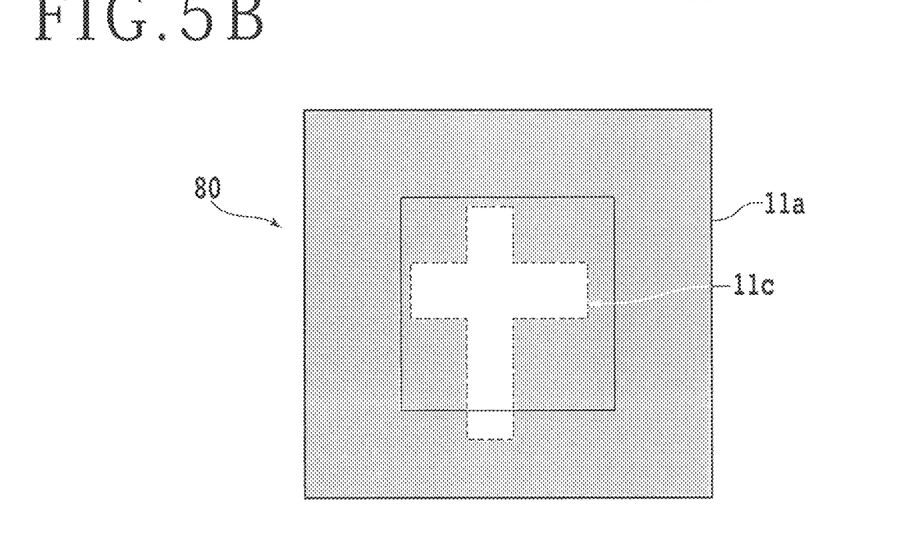
FIG. 5B is a schematic diagram of an image obtained by the photographing depicted in FIG. 5A.

In FIG. 4A, the amount of energization of the first light source 32 is set at 20%, and the amount of energization of the second light source 42 is set at 0%. In the image depicted in FIG. 4B, as compared with the image of FIG. 3B, projections and depressions on the top surface 11a side are photographed more clearly. FIG. 5A is a diagram depicting a state of photographing the top surface 11a side with only the side-illumination lighting unit 44 lit. FIG. 5B is a schematic diagram of an image obtained by performing the photographing with only the side-illumination lighting unit 44 lit. In FIG. 5A, the amount of energization of the first light source 32 is set at 0%, and the amount of energization of the second light source 42 is set at 20%. In the image depicted in FIG. 5B, as compared with the image of FIG. 3B, the contrast of the entire image is decreased.

Here, returning to FIG. 1, description will be made of other constituent elements of the cutting apparatus 2. An opening 4e is provided in a position on an opposite side of the opening 4a across the opening 4b. The opening 4e is provided with a cleaning unit 60 for cleaning the workpiece 11 after processing. The cleaning unit 60 has a spinner table that rotates in a state of holding the workpiece unit 17. A nozzle for jetting a gas-liquid mixed fluid of pure water and air to the spinner table is disposed above the spinner table.

Figure 6:
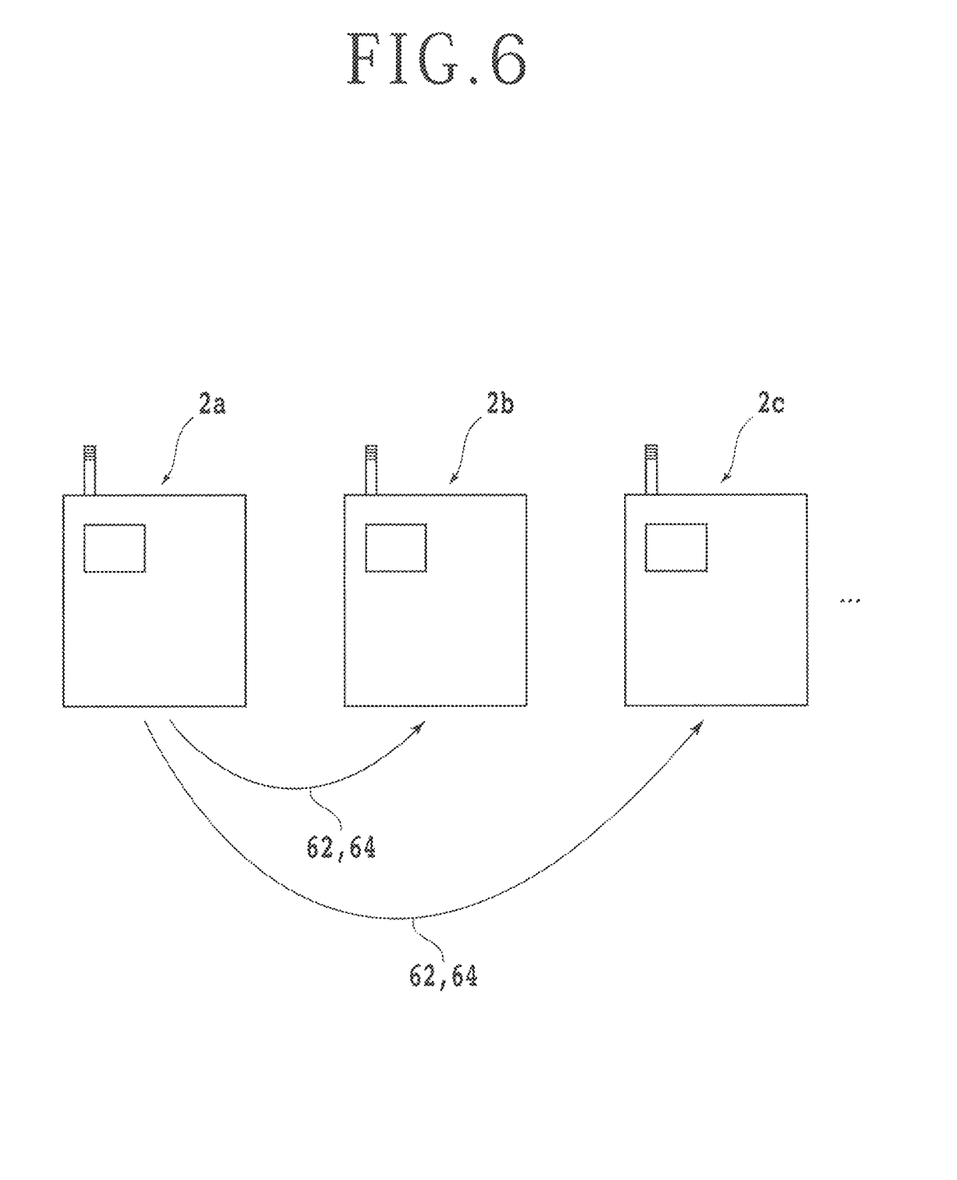
FIG. 6 is a diagram depicting a plurality of cutting apparatuses of a same type.

In a factory in which a plurality of cutting apparatuses 2 of a same type are installed, a plurality of workpieces 11 of a same kind are often processed by using the plurality of cutting apparatuses 2. FIG. 6 is a diagram depicting a plurality of cutting apparatuses (processing apparatuses) 2 of a same type. In order to perform simultaneous processing of workpieces 11 by using the plurality of cutting apparatuses 2, a photographing condition 62 including the control value 52, a processing condition 64, and the like are copied from a first cutting apparatus 2a to a second cutting apparatus 2b, a third cutting apparatus 2c, and the like.

Thus, the second cutting apparatus 2b and the like perform photographing, processing, and the like of the workpieces 11 under the same photographing condition 62 and the same processing condition 64 as those of the first cutting apparatus 2a. However, the brightness of the illuminator 48 of the second cutting apparatus 2b may be decreased due to a degradation or the like in the first light source 32 or the like in the second cutting apparatus 2b, for example. In this case, even when a dimming signal indicating the same control value 52 is input to the first cutting apparatus 2a and the second cutting apparatus 2b, the second cutting apparatus 2b obtains an image different in shade or brightness as compared with the first cutting apparatus 2a. Consequently, in the second cutting apparatus 2b, a problem may occur in identifying the position of a planned dividing line or in inspecting the position, range, state, and the like of a cut groove or the like. Accordingly, in the present embodiment, the brightness of illuminators 48 is adjusted so as to eliminate a difference between the illuminators 48 by comparing images obtained by adjusting the brightness of the illuminators 48.

Figure 7:
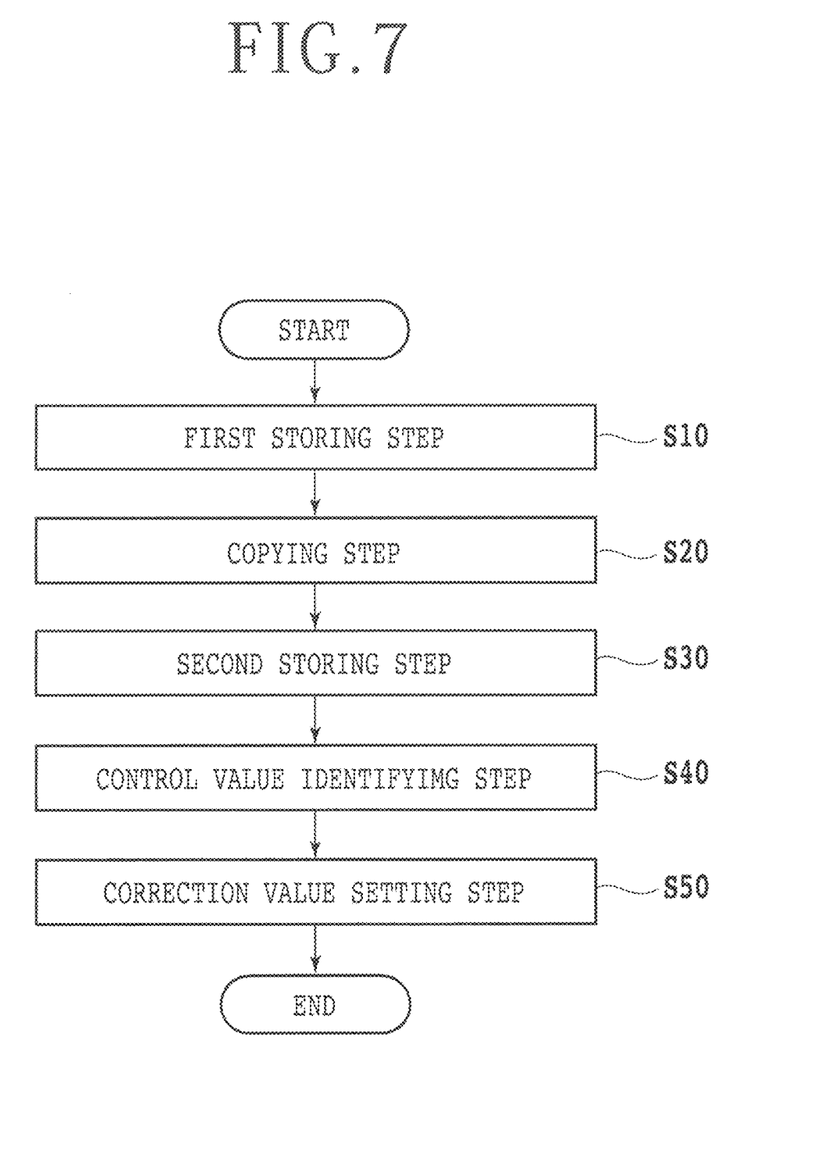
FIG. 7 is a flowchart of a method of adjusting the brightness of an illuminator according to a first embodiment.

FIG. 7 is a flowchart of a method of adjusting the brightness of an illuminator 48 according to a first embodiment. Incidentally, while a method of adjusting the brightness of an illuminator 48 in the first cutting apparatus 2a and the second cutting apparatus 2b will be described in the present embodiment, the brightness of illuminators 48 may be adjusted in three or more cutting apparatuses 2. The present embodiment first performs a first storing step S10. The first storing step S10 inputs a dimming signal indicating a first control value 52a to the dimmer 46 of the first cutting apparatus 2a, sets the illuminator 48 to a predetermined brightness, photographs the key pattern 11c on the top surface 11a side of the workpiece 11, and thereby obtains a sample image 70 (see FIG. 8A).

Figure 8A:
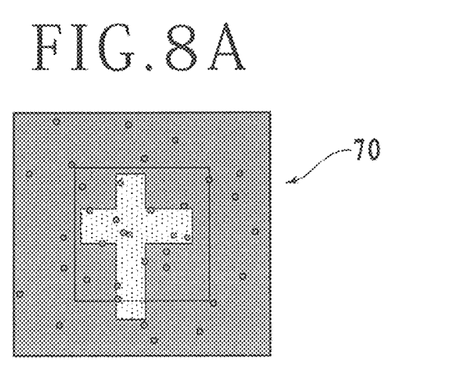
FIG. 8A is a schematic diagram of a sample image.

FIG. 8A is a schematic diagram of the sample image 70. In FIG. 8A, the sample image 70 is obtained with only the coaxial epi-illumination unit 38 lit such that the amount of energization of the first light source 32 is set at 20% and the amount of energization of the second light source 42 is set at 0% according to the first control value 52a. Then, the storage device 50a of the first cutting apparatus 2a stores the sample image 70 together with the first control value 52a. After the first storing step S10, a copying step S20 is performed.

The copying step S20 copies the sample image 70 stored in the storage device 50a of the first cutting apparatus 2a and the photographing condition 62 including the first control value 52a together with the processing condition 64 used in the first cutting apparatus 2a, and stores the sample image 70 and the photographing condition 62 in the storage device 50a of the second cutting apparatus 2b together with the processing condition 64. The first cutting apparatus 2a and the second cutting apparatus 2b and the like are connected to each other by wire or by radio, for example. In this case, in the copying step S20, information such as the sample image 70, the photographing condition 62 including the first control value 52a, the processing condition 64, and the like is sent from the first cutting apparatus 2a to the second cutting apparatus 2b via wire or radio. Incidentally, the first cutting apparatus 2a and the second cutting apparatus 2b may not be connected to each other by wire or by radio. In this case, the first cutting apparatus 2a and the second cutting apparatus 2b each include a writing and reading apparatus (not depicted) that writes the information to a recording medium such as a compact disc (CD), a digital versatile disc (DVD), a universal serial bus (USB) memory, or a magnetoresistive memory, and further reads the information from the recording medium.

After an operator records the information such as the sample image 70, the photographing condition 62 including the first control value 52a, the processing condition 64, and the like on the recording medium, the operator makes the writing and reading apparatus of the second cutting apparatus 2b read the recording medium. The information is thereby copied from the first cutting apparatus 2a to the second cutting apparatus 2b. After the copying step S20, the second cutting apparatus 2b obtains a plurality of comparative images (see FIG. 8B, FIG. 8C, and FIG. 8D) by photographing the key pattern 11c on the top surface 11a side with brightnesses of the illuminator 48 which brightnesses are specified by a plurality of different control values 52. Specifically, a plurality of comparative images are obtained by photographing the key pattern 11c according to a plurality of respective control values 52 specifying an energization amount smaller than an energization amount corresponding to the first control value 52a, the same energization amount as the energization amount corresponding to the first control value 52a, and an energization amount larger than the energization amount corresponding to the first control value 52a.

Incidentally, the present embodiment obtains the comparative images with only the coaxial epi-illumination unit 38 lit by setting the amount of energization of the second light source 42 at 0% and adjusting the amount of energization of the first light source 32 to various rates higher than 0%. For example, in the second cutting apparatus 2b, the key pattern 11c is imaged according to a control value 52-1 that sets the amount of energization of the first light source 32 at 16% and sets the amount of energization of the second light source 42 at 0%. In addition, the key pattern 11c is imaged according to a control value 52-2 that sets the amount of energization of the first light source 32 at 18% and sets the amount of energization of the second light source 42 at 0%.

Further, in the second cutting apparatus 2b, the key pattern 11c is imaged according to a control value 52-3 that sets the amount of energization of the first light source 32 at 20% and that sets the amount of energization of the second light source 42 at 0%. In addition, the key pattern 11c is imaged according to a control value 52-4 that sets the amount of energization of the first light source 32 at 22% and that sets the amount of energization of the second light source 42 at 0%. In addition, in the second cutting apparatus 2b, the key pattern 11c is imaged according to a control value 52-5 that sets the amount of energization of the first light source 32 at 24% and that sets the amount of energization of the second light source 42 at 0%. The storage device 50a of the second cutting apparatus 2b stores the thus obtained plurality of comparative images (second storing step S30).

Figure 8B:
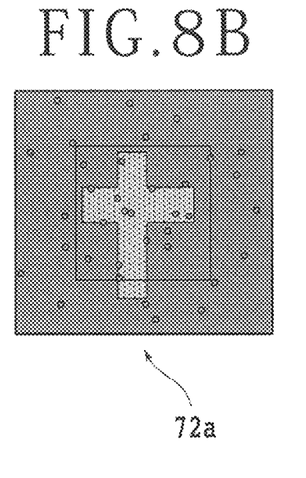
FIG. 8B is a schematic diagram of a comparative image.
Figure 8C:
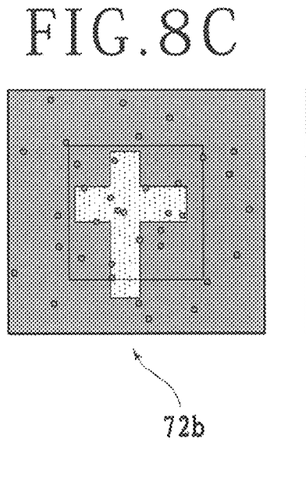
FIG. 8C is a schematic diagram of a comparative image.
Figure 8D:
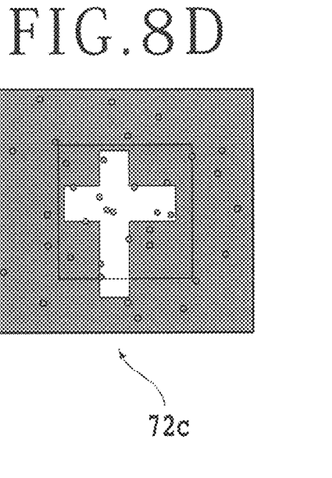
FIG. 8D is a schematic diagram of a comparative image.

FIG. 8B is a schematic diagram of a comparative image 72a obtained by imaging the key pattern 11c according to the control value 52-3. FIG. 8C is a schematic diagram of a comparative image 72b obtained by imaging the key pattern 11c according to the control value 52-4. FIG. 8D is a schematic diagram of a comparative image 72c obtained by imaging the key pattern 11c according to the control value 52-5. Incidentally, a comparative image obtained by imaging the key pattern 11c according to the control value 52-1 and a comparative image obtained by imaging the key pattern 11c according to the control value 52-2 are omitted.

After the second storing step S30, the sample image 70 is compared with the comparative image 72a, the comparative image 72b, and the comparative image 72c. In the present embodiment, a sum total $N_P$ of differences between numerical values indicating brightness levels of respective image-forming pixels is compared between the sample image 70 and each of the comparative images 72a, 72b, and 72c to be compared. A numerical value indicating a brightness level is, for example, a pixel value represented by 8 bits (that is, 256 gray levels) in a case where an image is a gray scale image. The pixel value is set at zero in a case where the color of a pixel is black. The pixel value is set at 255 in a case where the color of a pixel is white. As a matter of course, the images are not limited to gray scale images, but may be color images.

The sample image 70 and each of the comparative images 72a, 72b, and 72c are images having the same number of vertical and horizontal pixels. When the sum total $N_P$ of differences between the pixel values of the sample image 70 and the comparative image 72a is to be calculated, for example, a difference between the pixel values of respective pixels at each identical position in a vertical direction and a horizontal direction (that is, at each identical coordinate position) in the sample image 70 and the comparative image 72a is calculated, and thereafter, a sum total of such differences is calculated. In the present embodiment, a sum total $N_{P2}$ of differences between the pixel values of respective pixels at identical coordinate positions in the sample image 70 and the comparative image 72b is smaller than a sum total $N_{P1}$ of differences between the pixel values of respective pixels at identical coordinate positions in the sample image 70 and the comparative image 72a. Further, the sum total $N_{P2}$ is smaller than a sum total $N_{P3}$ of differences between the pixel values of respective pixels at identical coordinate positions in the sample image 70 and the comparative image 72c. Thus, the sum total $N_{P2}$ is a minimum. That is, a difference in brightness between the sample image 70 and the comparative image 72b is a minimum.

The control unit 50 of the second cutting apparatus 2b identifies, as a second control value 52b, the control value 52-4 at the time of photographing the comparative image 72b having a minimum difference in brightness from the sample image 70 according to a predetermined program stored in the auxiliary storage device of the control unit 50 itself (control value identifying step S40). After the control value identifying step S40, the control unit 50 of the second cutting apparatus 2b sets a difference between the second control value 52b and the first control value 52a as a correction value 58 of the control value 52 of the second cutting apparatus 2b with respect to the first cutting apparatus 2a (correction value setting step S50).

The first control value 52a determines an energization start timing of the first light source 32 of the first cutting apparatus 2a. The first control value 52a is, for example, a numerical value corresponding to a time from a start time point of a half cycle T/2 of the alternating current to timing $t_1$. When a dimming signal indicating the first control value 52a is input to the dimmer 46 of the first cutting apparatus 2a, the first light source 32 of the first cutting apparatus 2a is energized from timing $t_1$ to an end time point of the half cycle T/2. In this case, the amount of energization of the coaxial epi-illumination unit 38 of the first cutting apparatus 2a is, for example, 20%.

The second control value 52b determines an energization start timing of the first light source 32 of the second cutting apparatus 2b. The second control value 52b is, for example, a numerical value corresponding to a time from a start time point of a half cycle T/2 of the alternating current to timing $t_2$ earlier than timing $t_1$. When a dimming signal indicating the second control value 52b is input to the dimmer 46 of the second cutting apparatus 2b, energization is performed from timing $t_2$ to an end time point of the half cycle T/2. In this case, the amount of energization of the coaxial epi-illumination unit 38 of the second cutting apparatus 2b is, for example, 22%.

A difference between timing $t_2$ and timing $t_1$ corresponds to a difference in amount of energization. The correction value 58 is set as a numerical value corresponding to the difference in the amount of energization. In the correction value setting step S50, for example, the control unit 50 of the second cutting apparatus 2b automatically stores the correction value 58 in the storage device 50a of the control unit 50 itself. Incidentally, the correction value 58 may be stored in the storage device 50a of the second cutting apparatus 2b according to an instruction, an input, or the like of the operator. When a workpiece 11 is processed by using the second cutting apparatus 2b, a dimming signal indicating the second control value 52b obtained by adding the correction value 58 to the first control value 52a is input to the dimmer 46 of the second cutting apparatus 2b.

The amount of energization of the illuminator 48 of the second cutting apparatus 2b, that is, the amount of light (brightness) of the illuminator 48 of the second cutting apparatus 2b is thus corrected. Therefore, even when a light source degradation or the like occurs, a difference in brightness between the illuminators 48 can be reduced. That is, it is possible to reduce a difference in brightness between images obtained by the camera units 26 of the first cutting apparatus 2a and the second cutting apparatus 2b. There is also an advantage of being able to reduce the difference between the images obtained by the respective camera units 26 without replacing the light source or the like and without using a special test piece for measuring a difference in amount of light between the camera units 26.

A general procedure for cutting (processing) a workpiece 11 by the cutting apparatus 2 will next be described. When the workpiece 11 is to be cut, the workpiece unit 17 is first taken out to the pair of guide rails by a push-pull arm of the lower transfer unit 18. The pair of guide rails approaches each other along the X-axis direction, and thereby the position in the X-axis direction of the workpiece unit 17 is adjusted. Next, the workpiece unit 17 is transferred from the pair of guide rails to the chuck table 14 by the lower transfer unit 18.

After the undersurface 11b side is sucked and held by the holding surface 14a, a dimming signal indicating the control value 52 is input to the dimmer 46. Thus, the illuminator 48 is set to a predetermined brightness, and the top surface 11a side is photographed by the camera unit 26. Incidentally, in a case where the brightness of the illuminator 48 needs to be adjusted, the brightness of the illuminator 48 is adjusted by using the above-described correction value 58. When the control unit 50 performs predetermined image processing on an image obtained by the photographing (that is, on the basis of the image), the position of the key pattern 11c is identified. Then, the position, orientation, and the like of a planned dividing line disposed at a predetermined position from the position of the key pattern 11c are identified.

After the orientation of the chuck table 14 is adjusted by the rotational driving source such that the orientation of the planned dividing line is parallel with the X-axis direction, the workpiece 11 is cut according to a predetermined processing condition 64 while the cutting blade and the chuck table 14 are moved relative to each other in the X-axis direction. After the workpiece 11 is cut along all of the planned dividing lines, the upper transfer unit 20 transfers the workpiece unit 17 from the chuck table 14 to the cleaning unit 60, and the cleaning unit 60 cleans and dries the workpiece 11. Then, after the lower transfer unit 18 transfers the workpiece unit 17 from the cleaning unit 60 to the pair of guide rails, the workpiece unit 17 is pushed into the cassette 6b from the pair of guide rails by the push-pull arm of the lower transfer unit 18.

Figure 9:
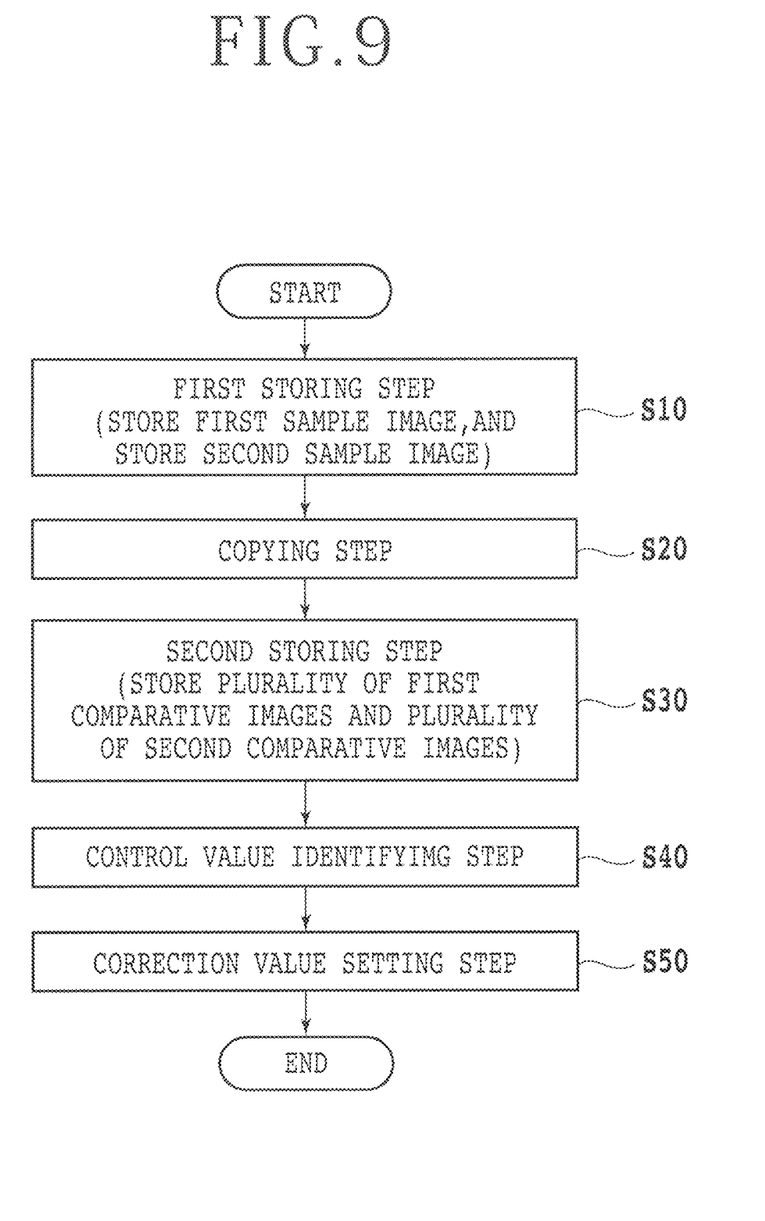
FIG. 9 is a flowchart of a method of adjusting the brightness of an illuminator according to a second embodiment.

A second embodiment will next be described. FIG. 9 is a flowchart of a method of adjusting the brightness of the illuminator 48 according to the second embodiment. The second embodiment also performs the first storing step S10 first. However, in the first storing step S10, the operation of the dimmer 46 is adjusted such that the first light source 32 and the second light source 42 individually illuminate in the first cutting apparatus 2a.

For example, when a dimming signal indicating a third control value 52c is input to the dimmer 46, the illuminator 48 illuminates such that the amount of energization of the first light source 32 is 20% and the amount of energization of the second light source 42 is 0%. Thus, a first sample image 70 is obtained with only the coaxial epi-illumination unit 38 lit. Thereafter, when a dimming signal indicating a fourth control value 52d is input to the dimmer 46, the illuminator 48 illuminates such that the amount of energization of the first light source 32 is 0% and the amount of energization of the second light source 42 is 20%. Thus, a second sample image 80 is obtained by photographing the key pattern 11c with only the side-illumination lighting unit 44 lit (see FIG. 5B). Incidentally, the order of illumination of the first light source 32 and the second light source 42 may be reversed.

Thereafter, the storage device 50a of the first cutting apparatus 2a stores the first sample image 70 and the second sample image 80 together with the third control value 52c and the fourth control value 52d (first storing step S10).

Next, the first sample image 70, the second sample image 80, the photographing condition 62 including the third control value 52c and the fourth control value 52d, and the processing condition 64 are copied, and stored in the storage device 50a of the second cutting apparatus 2b (copying step S20). After the copying step S20, the second storing step S30 is performed. However, in the second storing step S30 of the second embodiment, a plurality of first comparative images are obtained by photographing the key pattern 11c with only the coaxial epi-illumination unit 38 lit, and further, a plurality of second comparative images are obtained by photographing the key pattern 11c with only the side-illumination lighting unit 44 lit.

When the plurality of first comparative images and the plurality of second comparative images are obtained, the key pattern 11c is photographed according to a plurality of respective control values 52 specifying energization amounts smaller than energization amounts corresponding to the third control value 52c and the fourth control value 52d, the same energization amounts as the energization amounts corresponding to the third control value 52c and the fourth control value 52d, and energization amounts larger than the energization amounts corresponding to the third control value 52c and the fourth control value 52d, as in the first embodiment. Then, the storage device 50a of the second cutting apparatus 2b stores the plurality of first comparative images and the plurality of second comparative images (second storing step S30). After the second storing step S30, the control value identifying step S40 is performed.

In the control value identifying step S40 of the second embodiment, the control unit 50 of the second cutting apparatus 2b compares a sum total $N_P$ of differences between the pixel values of respective pixels at identical coordinate positions in the first sample image 70 and each of the first comparative images. Thus, a control value 52 at the time of photographing a first comparative image having a minimum difference in brightness from the first sample image 70 is identified as a fifth control value 52e. Further, the control unit 50 of the second cutting apparatus 2b compares a sum total $N_P$ of differences between the pixel values of respective pixels at identical coordinate positions in the second sample image 80 and each of the second comparative images. Thus, a control value 52 at the time of photographing a second comparative image having a minimum difference in brightness from the second sample image 80 is identified as a sixth control value 52f.

After the control value identifying step S40, the control unit 50 of the second cutting apparatus 2b sets a difference between the fifth control value 52e and the third control value 52c as a first correction value 58a of the control value 52 of the second cutting apparatus 2b with respect to the coaxial epi-illumination unit 38 of the first cutting apparatus 2a. Further, the control unit 50 of the second cutting apparatus 2b sets a difference between the sixth control value 52f and the fourth control value 52d as a second correction value 58b of the control value 52 of the second cutting apparatus 2b with respect to the side-illumination lighting unit 44 of the first cutting apparatus 2a (correction value setting step S50).

The first correction value 58a and the second correction value 58b are stored in the storage device 50a of the second cutting apparatus 2b. Thus, even when a difference occurs in amount of light between the first light sources 32, and further, a difference occurs in amount of light between the second light sources 42, a difference in brightness between the illuminators 48 of the first cutting apparatus 2a and the second cutting apparatus 2b can be reduced. The structures, the methods, and the like according to the foregoing embodiments can be modified and implemented as appropriate unless departing from the scope of objects of the present invention. For example, a pulse width modulation (PWM) method or another known method may be used in place of the phase control method.

In addition, while the foregoing embodiments use a halogen lamp as the first light source 32 and the second light source 42, an LED may be used in place of the halogen lamp. In this case, the optical fibers 40b of the side-illumination lighting unit 44 are omitted, and a plurality of LEDs are arranged in the casing 40, for example, such that the light emitting surfaces of the LEDs are located in the plurality of openings 40a. In addition, the brightness of the illuminator 48 may be adjusted by adjusting voltage applied to the LEDs. Further, while the cutting apparatus 2 has been described as an example of the processing apparatus in the foregoing embodiments, the processing apparatus may be a laser processing apparatus. The laser processing apparatus has a laser irradiating unit (processing unit) not depicted which unit irradiates the top surface 11a side of the workpiece 11 having the undersurface 11b side held by the holding surface 14a with a laser beam in place of the cutting unit 24.

The laser irradiating unit has a laser oscillator (not depicted) for generating a pulsed laser beam having a predetermined wavelength that is absorbed by the workpiece 11. The laser beam emitted from the laser oscillator passes through a predetermined optical system including a condensing lens and the like, and is applied to the top surface 11a side. The above-described camera unit 26 for imaging the workpiece 11 is provided in a position adjacent to the laser irradiating unit. An image of the top surface 11a side of the workpiece 11 held by the holding surface 14a is obtained by using the camera unit 26.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method of adjusting brightness of an illuminator in a processing apparatus, the method comprising:
a first storing step of a storage device of a first processing apparatus storing a sample image obtained by photographing a predetermined pattern arranged on a workpiece with a brightness of an illuminator, the brightness being specified by a first control value, together with the first control value in the first processing apparatus among a plurality of processing apparatuses each including a camera unit including the illuminator adjustable in brightness, an objective lens, and an imaging element, and configured to photograph a workpiece by making reflected light of light applied from the illuminator to the workpiece incident on the imaging element via the objective lens, a processing unit configured to process the workpiece on a basis of an image obtained by the camera unit, and a storage device configured to store a control value specifying the brightness of the illuminator and a processing condition of the processing unit when the processing unit processes the workpiece;
a copying step of copying the sample image and the first control value stored in the storage device of the first processing apparatus together with the processing condition used in the first processing apparatus, and storing the sample image, the first control value, and the processing condition in the storage device of a second processing apparatus;

a second storing step of the storage device of the second processing apparatus storing a plurality of comparative images obtained by photographing the predetermined pattern of the workpiece with brightnesses of the illuminator, the brightnesses being specified by a plurality of different control values, in the second processing apparatus;

a control value identifying step of comparing the sample image with the plurality of comparative images, and identifying, as a second control value, a control value at a time of photographing a comparative image having a minimum difference in brightness from the sample image; and a correction value setting step of setting, in the second processing apparatus, a difference between the second control value and the first control value as a correction value of the control value of the second processing apparatus with respect to the first processing apparatus.

2. The method of adjusting the brightness of the illuminator in the processing apparatus according to claim 1, wherein in the control value identifying step, differences between numerical values indicating brightness levels of respective image-forming pixels are calculated at respective identical positions in a vertical direction and a horizontal direction in the sample image and each of the comparative images, and a sum total of the differences is compared.

3. The method of adjusting the brightness of the illuminator in the processing apparatus according to claim 1, wherein the illuminator includes a coaxial epi-illumination unit configured to apply light along an optical axis of the objective lens and a side-illumination lighting unit configured to apply light inclined with respect to the optical axis of the objective lens, in the first storing step, the first control value includes a third control value and a fourth control value, the sample image includes a first sample image and a second sample image, the storage device of the first processing apparatus stores, together with the third control value and the fourth control value, the first sample image obtained by photographing the predetermined pattern of the workpiece with only the coaxial epi-illumination unit lit according to the third control value and the second sample image obtained by photographing the predetermined pattern of the workpiece with only the side-illumination lighting unit lit according to the fourth control value, in the second storing step, the storage device of the second processing apparatus stores a plurality of first comparative images obtained by photographing the predetermined pattern of the workpiece with only the coaxial epi-illumination unit lit according to a plurality of respective different control values and a plurality of second comparative images obtained by photographing the predetermined pattern of the workpiece with only the side-illumination lighting unit lit according to a plurality of respective different control values, in the control value identifying step, the second control value includes a fifth control value and a sixth control value, a control value at a time of photographing a first comparative image having a minimum difference in brightness from the first sample image is identified as the fifth control value by comparing the first sample image with each of the first comparative images, and a control value at a time of photographing a second comparative image having a minimum difference in brightness from the second sample image is identified as the sixth control value by comparing the second sample image with each of the second comparative images, and in the correction value setting step, a difference between the fifth control value and the third control value is set as a first correction value of the control value of the second processing apparatus with respect to the first processing apparatus in the second processing apparatus, and a difference between the sixth control value and the fourth control value is set as a second correction value of the control value of the second processing apparatus with respect to the first processing apparatus in the second processing apparatus.

* * * * *